United States Patent [19]

Teuling et al.

[11] Patent Number: 4,872,055
[45] Date of Patent: Oct. 3, 1989

[54] LINE SYNCHRONIZING CIRCUIT IN A PICTURE DISPLAY DEVICE

[75] Inventors: Dirk J. Teuling; Jozef J. M. Hulshof, both of Eindhoven, Netherlands

[73] Assignee: U. S. Philips Corporation, New York, N.Y.

[21] Appl. No.: 145,855

[22] Filed: Jan. 20, 1988

[30] Foreign Application Priority Data

Feb. 4, 1987 [NL] Netherlands .................. 8700265

[51] Int. Cl.⁴ .............................................. H04N 5/04
[52] U.S. Cl. ................................ 358/148; 358/149; 358/150; 315/364; 340/814
[58] Field of Search ............... 340/814; 358/319, 320, 358/148, 149, 150, 153, 158, 264; 315/364, 369, 370, 387, 411

[56] References Cited

U.S. PATENT DOCUMENTS

| | | | |
|---|---|---|---|
| 4,297,728 | 10/1981 | Lowe .................... | 358/148 |
| 4,346,407 | 8/1982 | Baer et al. ............ | 340/814 |
| 4,535,358 | 8/1985 | Duijkers .............. | 358/148 |
| 4,574,307 | 3/1986 | Nillesen ............... | 358/148 |
| 4,583,119 | 4/1986 | Roscoe ................. | 358/150 |
| 4,616,259 | 10/1986 | Moran et al. ......... | 358/148 |
| 4,631,587 | 12/1986 | Turner ................. | 358/148 |
| 4,660,080 | 4/1987 | Dietz et al. .......... | 358/148 |
| 4,672,448 | 6/1987 | Gioiosa ................ | 358/148 |
| 4,672,449 | 6/1987 | Kraus et al. ......... | 340/814 |
| 4,713,690 | 12/1987 | Watanabe et al. .... | 340/814 |
| 4,780,759 | 10/1988 | Matsushima et al. | 358/148 |

*Primary Examiner*—Gerald Brigance
*Assistant Examiner*—Richard Hjerpe
*Attorney, Agent, or Firm*—Edward W. Goodman

[57] ABSTRACT

A line sychronizing circuit in a picture display device, has a phase control loop including an oscillator and a phase comparison stage. In order to enlarge the capture range of the control loop, the phase comparison stage is in the form of a phase-frequency detector having a trigger action on edges of pulses applied, the circuit being provided with means for inhibiting the supply of the control signal form the phase-frequency detector during a predetermined period after establishing that the phase difference measured by the phase-frequency detector between the local line-frequency signal and the incoming line synchronizing signal is larger than a predetermined value. In the perdetermined period, the oscillator signal has substantially the same frequency as before establishing that the phase difference measured by the phase frequency detector is larger than the predetermined value. The supply of the control signal is restored during a second predetermined period after the supply of the control signal has been inhibited, and this irrespective of the phase difference between the local line signal and the incoming line synchronizing signal.

20 Claims, 2 Drawing Sheets

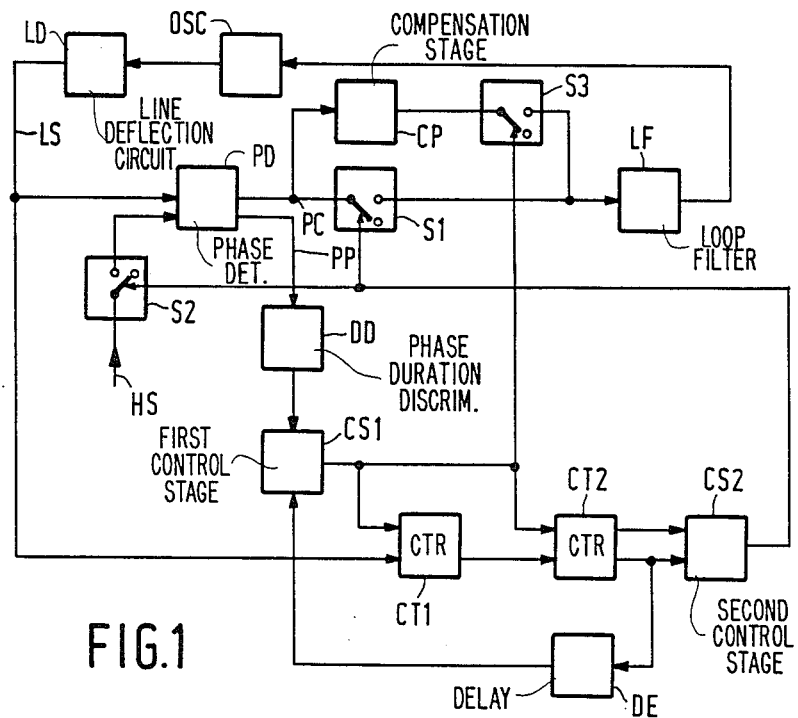
FIG.1
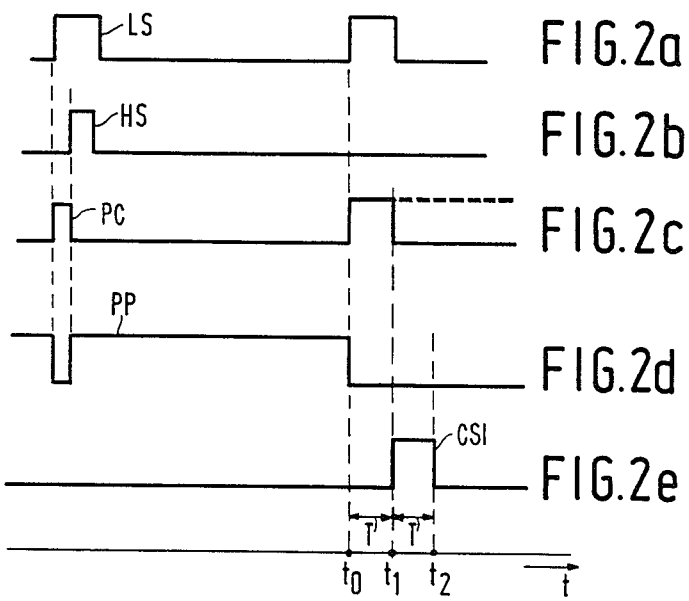
FIG.2a
FIG.2b
FIG.2c
FIG.2d
FIG.2e

LINE SYNCHRONIZING CIRCUIT IN A PICTURE DISPLAY DEVICE

BACKGROUND OF THE INVENTION

The invention relates to a circuit for the line synchronization in a picture display device, the circuit comprising a phase control loop including an oscillator for generating a local line-frequency signal, means for applying the local signal and an incoming signal comprising a line synchronizing signal to a phase comparison stage for comparing the phase between the signals applied and for applying a signal, which is dependent on the measured phase difference, to a loop filter for smoothing the signal and for applying the control signal obtained to the oscillator for controlling the frequency and/or the phase of the local signal.

Phase control loops of this type are generally used in picture display devices for continuously controlling the oscillator which generates the local line-frequency signal for the purpose of line deflection in a picture display tube or for the purpose of other circuits including a switch switching at the line frequency, for example the circuit for generating the extra high tension for the final anode of the tube or switched mode power supply circuits. The phase comparison stage is generally in the form of a multiplier stage for multiplying its input signals. For small phase differences such a stage is linear. However, a line phase control loop including a multiplier has the drawback that its lock range is wider than its capture range and that the control loop is unsuitable to capture over a wide frequency range only once. The control loop may also capture on a subharmonic of the line frequency. The line synchronizing circuit is therefore not readily suitable for picture display devices, for example monitors, with more than one repetition frequency over a wide range for the incoming line synchronizing pulses. The circuit described in European patent application No. 173,554 which is intended for more than one line frequency includes a facility for preventing capture errors.

SUMMARY OF THE INVENTION

It is an object of the invention to provide a circuit of the type described above in which the phase control loop can capture without capture errors in a very wide capture range. To this end, the circuit according to the invention is characterized in that the phase comparison stage is in the form of a phase-frequency detector having a trigger action on edges of applied pulses, the circuit comprising means for inhibiting the supply of the control signal during a predetermined duration after establishing that the phase difference measured by the phase-frequency detector between the local signal and the incoming line synchronizing signal is larger than a predetermined value.

A phase-frequency detector of this type is known per se. An example of such a detector is described in the "Philips Data Handbook, Integrated Circuits, Book ICO6N, New series, 1986" pages 721 to 745 under type number PC74HC/HCT4046A. This is an integrated circuit for a phase control loop including a voltage-controlled oscillator which is suitable for all sorts of applications and which comprises three phase comparison stages one of which is of the type which is important to the invention. The control loop can capture in a very wide frequency range and the capture range is always equal to the lock range. Another property is the fact that in the non-captured state of the loop, the frequency error is controlled to zero, while in the captured state the phase error is controlled to zero. Such a phase-frequency detector has hitherto been rather unsuitable for use in picture display devices. A reason is that this detector is sensitive to the absence of incoming synchronizing pulses. If only one pulse is absent the control loop comes out of its captured state and it takes a comparatively long time before the captured state is re-established again. The invention is based on the recognition that this drawback can be obviated so that a phase-frequency detector can be used in picture display devices. In such a device, for example a television receiver, a line synchronizing pulse may in fact be missed when receiving a television signal with noise and interference. In monitors, the incoming signal may be a line synchronizing signal which is comparatively free from noise and with which few difficulties are to be expected, but it may be alternatively a composite synchronizing signal, i.e. a signal having a perturbation of the series of line synchronizing pulses during the field change. Since the supply of the control signal is inhibited, the control loop does not immediately change over to the non-captured state. It will be noted that phase comparison stages, which are inhibited during the field change, are known per se, for example from European patent application No. 186,443. In the absence of incoming synchronizing pulses, the control loop remains operative in a normal manner.

The circuit is advantageously characterized in that at the end of the time interval in which the supply of the control signal has been inhibited, the output signal of the phase-frequency detector has a value which is substantially equal to the value assumed by this signal between two successive input pulses when the supply of the control signal is enabled. Due to this measure, the control loop can capture very rapidly after the end of the predetermined period.

In a first embodiment, the circuit is characterized in that the supply lead between the phase-frequency detector and the loop filter includes a first switch for inhibiting the supply of the output signal of the phase-frequency detector to the loop filter during the duration after establishing that the phase differences measured by the phase-frequency detector is larger than the predetermined value and is also characterized by a second switch for inhibiting the supply of one of the input signals of the phase-frequency detector to an input thereof in the time interval in which the switch is non-conducting, and by means for applying a pulse edge to the said input of the phase-frequency detector at the end of the time interval in which the first and the second switch are non-conducting. In this case, the circuit is further characterized by a pulse duration discriminator for receiving a signal generated by the phase-frequency detector, this signal indicating the phase difference between edges of the pulses applied to said detector and for applying information to a control stage for blocking the first and the second switch when the phase difference measured is larger than the said predetermined value. In this case, use is made of a pulsatory signal generated by the phase-frequency detector which signal, according to the "Data handbook", may serve to indicate the captured state of the control loop, the pulses of this signal in the synchronous state being narrower than the maximum admissible phase error.

In a different manner, the circuit is characterized by means for generating a set signal for setting the phase-frequency detector to a state in which the output signal of the detector has the value, that is to say, the value which is substantially equal to the value assumed by this signal between two successive input pulses when the supply of the control signal is enabled.

The circuit is advantageously characterized in that during the time interval in which the supply of the control signal is inhibited, the local signal has substantially the same frequency as before establishing that the phase difference measured by the phase-frequency detector is larger than the predetermined value. Due to this measure, the phase control loop is free running after a perturbation without a perturbation of the natural frequency of the oscillator occurring. Not only is a still or non-distorted picture obtained thereby, which is pleasant to the viewer, but it is also ensured that the control loop captures very rapidly after the end of the interval in which the supply of the control signal has been inhibited in the case when the incoming line synchronizing pulses then have the same repetition frequency and the same phase as before the perturbation.

The circuit is preferably characterized by means for inhibiting the supply of the control signal during a time interval, commencing with the first local pulse, which occurs after establishing that the phase difference measured by the phase-frequency detector is larger than the predetermined value, this interval having at least the same duration as a field synchronizing interval. In this manner it is ensured that a perturbation does not occur during the field change.

The circuit is advantageously characterized by means for enabling the supply of the control signal during a second predetermined duration after the supply of the control signal has been inhibited, and this irrespective of the phase difference between the local line signal and the incoming line synchronizing signal. This gives the phase control loop the time to capture in the case of a deviation of the frequency and/or the phase of the oscillator with respect to that of the incoming synchronizing signal without this non-synchronous state resulting in a renewed inhibition of the supply of the control signal, which would needlessly delay capturing.

BRIEF DESCRIPTION OF THE DRAWINGS

The invention will now be described in greater detail by way of example with reference to the accompanying drawings, in which:

FIG. 1 shows a block diagram of a part of a picture display device, for example a monitor, including the circuit according to the invention;

FIGS. 2a, 2b, 2c, 2d, 2e show waveforms occurring therein; and

DETAILED DESCRIPTION OF THE INVENTION

Figure 3:
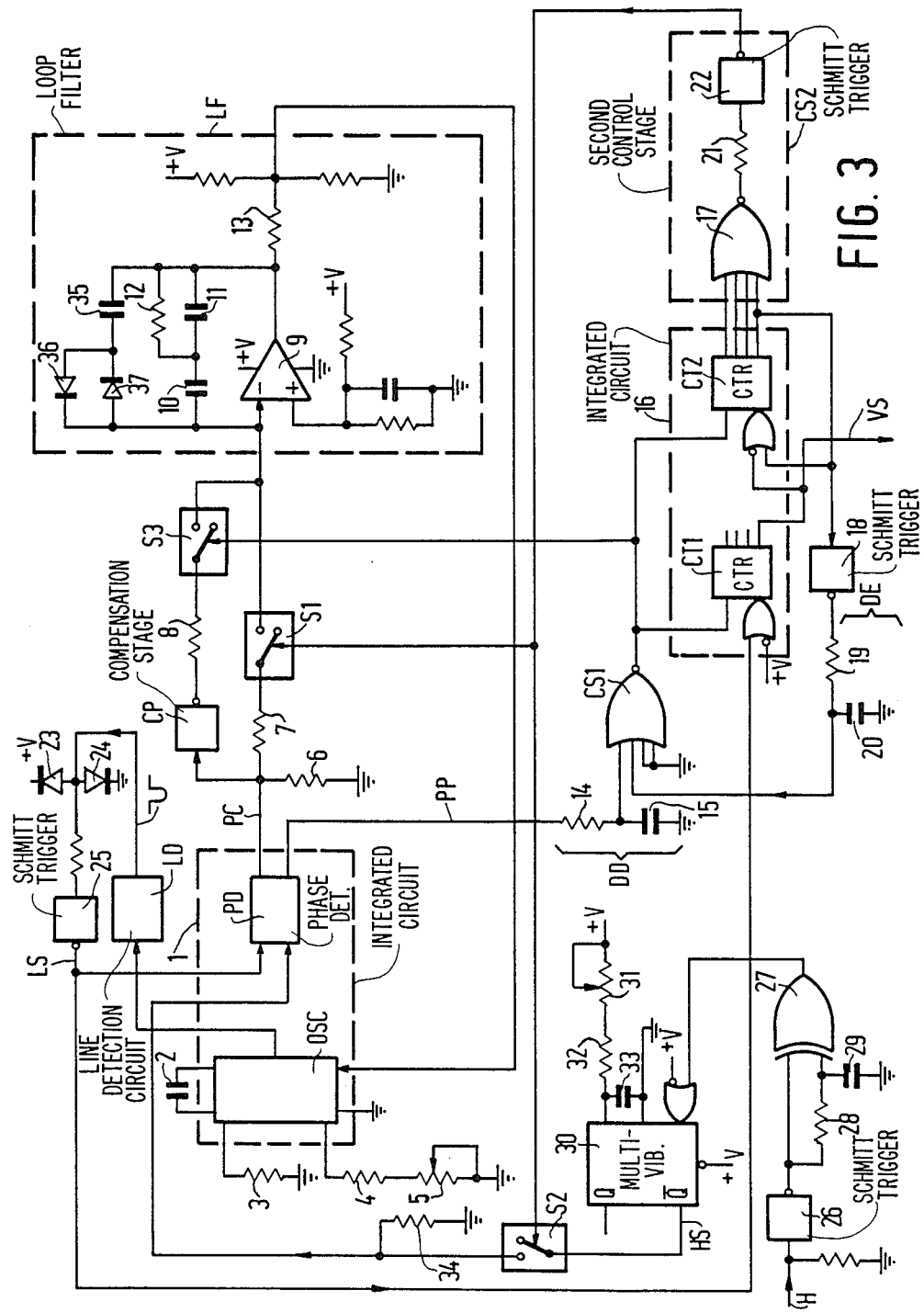
FIG. 3 shows a diagram which is more detailed than that of FIG. 1.

In FIG. 1, the reference PD denotes a phase detector which receives a locally generated line signal LS and an incoming line synchronizing signal HS. The signal at an output PC of detector PD is dependent on the phase difference between these signals and is applied via a switch S1 to a loop filter LF which is a low-pass filter by which it is smoothed. The signal obtained is a control signal, for example a voltage, which is applied to a controllable oscillator OSC for controlling the frequency and/or the phase of the signal generated thereby. This signal is applied to a line deflection circuit LD in which it is processed in known manner for the purpose of deflection in the horizontal direction in a picture display tube (not shown). A signal present in the circuit LD, for example a retrace signal which is present across a transformer winding, is the local line signal LS which is applied to detector PD. In a different manner the local signal may be the oscillator signal. The output signal PC of detector PD is also applied to a compensation stage CP an output of which is connected via a switch S3 to the input of filter LF which is also connected to switch S1. The line synchronizing signal HS reaches detector PD via a switch S2.

During normal operation, switches S1 and S2 are conducting while switch S3 is non-conducting. The line synchronizing signal HS, which is derived from an incoming video signal, for example by means of a synchronizing signal separator and which may be present in a composite synchronizing signal, and the local line signal LS are synchronous in the captured state of the phase control loop constituted by elements PD, LF, OSC and LD, that is to say, these signals have the same frequency and substantially the same phase. The output signal of detector PD is then a direct voltage which is applied via filter LF to a control input of oscillator OSC which is thereby maintained at the correct frequency. In the case of changes of the line frequency of the incoming line synchronizing signal HS, the capture state must prevail or this state must be restored rapidly if the synchronism has gotten lost. In the latter case, the output signal PC of detector PD is an alternative voltage. In FIG. 1, detector PD is in the form of a phase and frequency detector with a trigger action on pulse edges of signal HS and of signal LS. Such a detector is known. A phase control loop equipped therewith has, inter alia, the property that independent of the loop filter, the capture and lock range are equal to each other in a wide frequency range. Thus, when the incoming line frequency changes, for example because there is a changeover to another video signal source, the control loop captures rapidly so that the perturbation caused by the change has a short duration.

However, the phase detector used has the drawback that it is very sensitive: if only one incoming line synchronizing pulse is absent, the loop loses its synchronism upon the occurrence of a local pulse. This is elucidated with reference to FIG. 2 in which line retrace pulses (FIG. 2a), line synchronizing pulses (FIG. 2b) and the input signal of filter LF (FIG. 2c) are shown. Firstly, FIG. 2 shows the case in which the loop is in synchronism, which means that the time interval between the leading edges of the first pulses in FIG. 2a and 2b is shorter than a predetermined duration T. Each input of detector PD reacts to edges having a given direction. For example, in the circuit described, rising edges are concerned for both inputs. The signal PC at the output of detector PD may assume three values: the output may be connected to a positive voltage, the output may be connected to ground or the output may have a high impedance so that the signal PC has a voltage value which is between the other two values, that is to say, the so-called neutral value. If, as is shown, the leading edge of the signal of FIG. 2a occurs before the leading edge of the signal of FIG. 2b, signal PC assumes the positive value in the interval between the two leading edges. Before the first leading edge and after the second leading edge, signal PC has the neutral value. If, on the other hand, the leading edge of the signal of FIG. 2b occurs first, signal PC has the lowest possible value in the said interval, that is to say the ground potential. In the captured stage of the control loop, the duration of the pulse in FIG. 2c is shorter than the predetermined duration T.

If a line synchronizing pulse is absent in FIG. 2b, signal PC remains at a high level after the occurrence at an instant $t_o$ of the leading edge of the retrace pulse, more specifically, during a time which is much longer than the predetermined duration T defining the synchronism. This is shown by the broken line in FIG. 2c. As a result the output voltage of filter LF is much higher than the value which would have been produced in the synchronism. Under these circumstances, oscillator OSC is controlled to a different frequency, which is very undesirable.

A voltage (FIG. 2d) is present at a second output PP of detector PD, this voltage having a low value between the two leading edges of FIG. 2a and 2b and a high value during the rest of the time, while signal PC has the neutral value. In synchronism, the negative pulse obtained has a duration which is shorter than T. If a line synchronizing pulse is absent, signal PP remains low after instant $t_o$. Signal PP is applied to a first control stage CS1 via a pulse duration discriminator DD. An output of stage CS1 operates switch S3 and is also connected to the reset terminal of a first counter CT1 and to the reset terminal of a second counter CT2. The local line signal LS is applied to a clock input of counter CT1 and an output signal of counter CT1 is applied to a clock input of counter CT2. An output signal of counter CT2 is applied to stage CS1 via a delay element DE. Outputs of counter CT2 are also connected to a second control stage CS2 which operates switches S1 and S2.

Discriminator DD delays the signal applied thereto by a delay which is equal to the above-mentioned duration T. If the duration of pulse PP is shorter than T, that is to say if the synchronous state prevails, the delayed pulse has no influence; switches S1 and S2 remain conducting, while switch S3 is non-conducting. If, on the other hand, the duration of pulse PP is longer than T, for example because a line synchronizing pulse is absent, a pulse having a rising leading edge (FIG. 2e) at an instant $t_1$ is present at the output of stage CS1; instant $t_1$ occurs a duration T after the occurrence at instant $t_o$ of the leading edge of line pulse. This pulse resets both counters CT1 and CT2 at instant $t_1$, while switch S3 is rendered conducting. Since all outputs of counter CT2 are now low, stage CS2 changes over to the state in which switches S1 and S2 are rendered non-conducting. The control loop and the supply of the synchronizing pulses are thus interrupted. Since counter CT2 is reset, a reset pulse is applied to stage CS1 with a delay which is brought about by element DE. This delay has also a duration which is equal to T. At an instant $t_2$ which occurs a duration T later than instant $t_1$, stage CS1 is reset. A falling edge is then present at the output of stage CS1, this edge terminating the pulse which started at instant $t_1$ so that switch S3 is rendered non-conducting, while counters CT1 and CT2 no longer receive a reset signal and are consequently enabled.

It is apparent from FIG. 2c that in the synchronous stage, a short-lasting pulse is produced at the output PC of detector PD, this pulse having little influence on oscillator OSC due to the integration by means of filter LF. The pulse caused by the absence of a line synchronizing pulse has a longer duration. Compensation stage CP includes an inverter stage. The interference pulse produced during the interval between instants $t_1$ and $t_2$ in the signal PC, is inverted and the inverted pulse is applied to filter LF via the conducting switch S3. This pulse has the same content as the interference pulse produced during the interval between instants $t_o$ and $t_1$ which interference pulse was applied to filter LF via switch S1. At instant, $t_2$, the input signal of filter LF assumes the same value as before instant $T_o$ (FIG. 2c, the solid line). Since both switches S1 and S3 are non-conducting after instant $t_2$, the control voltage at the output of filter LF remains unchanged. In this way the interference pulse between instants $t_o$ and $t_1$ is eliminated by the interference pulse between instants $t_1$ and $t_2$; so that oscillator OSC oscillates at substantially the same frequency as before the interference pulses. Since the supply of the line synchronizing pulses is interrupted, this state does not change.

Upon the occurrence of the first local line pulse, which is present after instant $t_2$, counter CT1 starts counting. Counter CT1 is a 10-counter. It counts 10 line periods and counter CT2, which is a 7-counter, starts counting at the count 10 of counter CT1. The transition from the count 0 to the count 1 of counter CT2 causes a transition of stage CS2 to the state in which switches S1 and S2 are rendered conducting. This state is maintained until after the count 7 of counter CT2, that is to say during 70 line periods. After the loss of the synchronous state has been established at instant $t_1$, the control loop and the supply of line synchronizing pulses are interrupted from the subsequent line retrace during 10 line periods and both the control loop and the supply are restored during the subsequent 70 line periods. The latter state is independent of whether or not the pulses applied to detector PD occur simultaneously.

During the counting time of counter CT1, oscillator OSC oscillates at substantially the same frequency as before instant $t_o$. Possible fluctuations are negligibly small. If after the counting time the synchronizing pulses are present with the same repetition frequency and the same phase as before the perturbation, the control loop captures very rapidly after it is closed again. This case occurs, inter alia if the perturbation is produced during the field synchronizing interval of an incoming composite synchronizing signal. In fact, equalizing pulses of the double line frequency may occur in this interval. The first of these pulses does not coincide with a line retrace pulse. Upon its occurrence, the control loop is thus interrupted in the manner described. Since the field synchronizing interval, i.e. the interval in which the pre-equalizing, the field synchronizing and the post-equalizing pulses successively occur, lasts at most $7\frac{1}{2}$ line periods (European television standard) or 9 line periods (American television standard), the perturbation has certainly finished after 10 line periods. It will be noted that the interruption of the control loop in the case of the perturbation occurring during the field synchronizing interval is also necessary due to the fact that the control loop, which has a wide capture range, would otherwise attempt to cause the line oscillator to oscillate at the double frequency. If the synchronizing signal does not comprise an equalizing pulse, the circuit operates similarly.

During the counting time of counter CT2, oscillator OSC is given an opportunity, if necessary, to assume a new frequency because the control loop operates in the normal manner, The choice of 70 line periods emanates from the following considerations. If the phase error is still too large after the 10-line period interruption of the control loop, a number of line periods is required for the loop to recapture. If the available number of line periods is too small, the oscillator will still not have the correct frequency after the end thereof, but, on the other hand, the number must not be too large due to the smallest expected line number per field. If, for example, the picture display device, of which the present line circuit forms part, is to be suitable for the display of video signals at a line frequency of approximately 14.5 kHz and a field frequency of 120 Hz, the counting time of counter CT2 must be shorter than 14500/120, i.e. approximately 120 line periods. It has been found in practice that 70 line periods is a practical choice with which favorable results are obtained.

Since the local line signal in the described circuit originates from the line deflection circuit, variations which are possibly produced in this circuit are eliminated by means of the control. Such variations are caused, for example by variable switch-off times of a power switch in the circuit in dependence upon the line frequency and also upon the brightness on the display screen, if the high voltage for the final anode of the picture display tube is generated by this circuit, or in dependence upon an east-west raster correction. On the other hand, the foregoing has proved that the synchronizing signal HS must be free from noise and interference as much as possible. The synchronizing signal applied to the phase detector PD is therefore preferably a "clean" signal which is derived from the video signal made available for the picture display device. For this purpose, an additional phase control loop may be used in known manner for generating the synchronizing signal applied to the circuit of FIG. 1, this loop receiving the incoming signal.

FIG. 3 shows a block diagram which is more detailed than that of FIG. 1. In FIG. 3 phase detector PD and oscillator OSC form part of an integrated circuit 1 of the Philips type PC74HC/HCT4046A to which a capacitor 2 of 10 nF and three resistors 3, 4 and 5 of 27 kΩ are connected to suitable connection terminals. Circuit 1 includes three phase detectors of which the second is utilized. A resistor 6 of 1MΩ is connected to the output PC thereof, which resistor is connected to ground at the other end. Resistor 6 produces a systematic phase error for the oscillator OSC so that in the synchronous state of the control loop, a line retrace pulse always occurs before a line synchronizing pulse, more specifically approximately 50 ns earlier. This time is longer than the change-over time of switching elements in circuit 1. Switches S1 and S3 are each preceded by separating resistors 7 and 8 of 1.5 kΩ. Compensation stage CP is in the form of one of six inverting Schmitt triggers incorporated in an integrated circuit of the Philips type PC74HC/HCT14. Filter LF is in the form of a differential amplifier 9 having an inverting input to which switches S1 and S3 are connected and a non-inverting input which is connected to a direct voltage of approximately 2.5 V determining the neutral value of signal PC. The series arrangement of two capacitors 10 of 330 nF and 11 of 33 nF is incorporated between the inverting input and an output of amplifier 9, and a resistor 12 is arranged parallel to capacitor 11. The output of amplifier 9 is connected to a resistance voltage divider and to the control input of oscillator OSC via a resistor 13 of 4.7 kΩ.

The pulse duration discriminator DD, which is connected to the pulse output PP of phase detector PD, comprises an RC network including a resistor 14 of 1 kOhm and a capacitor 15 of 330 pF. At the instant $t_o$ at which a falling edge is present in the signal PP (FIG. 2d), the voltage across capacitor 15 starts decreasing in accordance with an exponential function. The time constant of this variation is 330 ns and determines the duration T. The control stage CS1 is one of two NOR gates which are incorporated in an integrated circuit of the Philips type PC74HC/HCT4002. An input is connected to capacitor 15 and two other inputs are connected to ground. Counters CT1 and CT2 are synchronous 4-bit counters and form part of an integrated circuit 16 of the Philips type PC74HC/HCT4518 each having a first clock pulse input which reacts to rising pulse edges, a second clock pulse input which reacts to falling pulse edges, which two clock pulse inputs operate as OR gates, and four outputs for all bit positions. The four outputs of counter CT2 are connected to four inputs of a NOR gate 17. The reset inputs of counter CT1 and counter CT2 are connected to the output of the NOR gate CS1. The first clock pulse input of counter CT1 is connected to a positive voltage and the second clock pulse input receives the signal LS. The output of counter CT1 having the most significant bit is connected to the second clock pulse input of counter CT2 and the other outputs of counter CT1 are not connected. The output of counter CT2 having the most significant bit is connected to the first clock pulse input and to an inverting Schmitt trigger 18. The delay element DE is connected between the output of trigger 18 and a fourth input of the NOR gate CS1. This element comprises an RC network including a resistor 19 of 1 kΩ and a capacitor 20 of 330 pF.

Before instant $t_o$, the input of the NOR gate CS1 connected to capacitor 15 conveys a positive voltage and the other inputs have the ground potential. The output thus carries a logic 0. After instant $t_o$, the positive voltage decreases. At instant $t_1$, this voltage has decreased to such an extent that the output of gate CS1 becomes a logic 1 so that switch S3 is rendered conducting, while counters CT1 and CT2 receive a reset pulse. The most significant bit of counter CT2 is a logic 0 so that the voltage across capacitor 20, which was zero, starts increasing in accordance with an exponential function. At instant $t_2$, the voltage across capacitor 20 has become so high that the output of gate CS1 becomes a logic 0, so that counters CT1 and CT2 are enabled while switch S3 is rendered non-conducting.

Counter CT1 reacts to rising pulse edges. The leading edge of the first pulse LS after instant $t_2$ is such an edge by which counter CT1 is enabled. Counter CT2, on the other hand, reacts to falling pulse edges. After the count 7 of counter CT1, the most significant bit of this counter becomes a logic 1, but this has no influence on counter CT2. After the count 9 of counter CT1, the said bit becomes a logic 0 resulting in counter CT2 being enabled. At least one of the outputs thereof becomes a logic 1 and a logic 0 is now present at the output of gate 17. This output is connected via a resistor 21 of 3.3 kΩ to an inverting Schmitt trigger 22 whose output controls switches S1 and S2. Elements 17, 21 and 22 constitute the control stage CS2. Thus it is found that during the tenth line period after the loss of synchronization the said switches are rendered conducting again. After the seventh count of counter CT2, that is to say after 80 line periods after the perturbation, the most significant bit of this counter becomes a logic 1. Due to the connection to the first clock pulse input, counter C2 continues to count so that switches S1 and S2 remain conducting. The voltage across capacitor 20, which was high, becomes low, but since the signal PP is high in the synchronism, gate CS1 does not have any influence on the three switches.

The retrace signal which is present in the line deflection circuit LD comprises negatively directed pulses. This signal is applied to an inverting Schmitt trigger 25 for applying the signal LS to phase detector PD and to counter CT1 via a limiter comprising two diodes 23 and 24 which are connected in the manner indicated between a positive direct voltage and ground. An incoming signal H from a synchronizing signal separator and comprising either a composite synchronizing signal or a signal having only line synchronizing pulses is applied to an inverting Schmitt trigger 26. The pulses in the signal H have either the positive or the negative polarity. The output of trigger 26 is directly connected to a first input of an EX-OR gate 27 and to a second input of EX-OR gate 27 via an integrating RC network. This network comprises a resistor 28 of 100 k $\Omega$ and a capacitor 29 of 220 nF. A signal having the same shape as signal H but with the positive polarity irrespective of the polarity of signal H is present at an output of gate 27. This part of the circuit has been described in greater detail in U.S. Pat. No. 4,583,119 (PHB.32 965) which is herein incorporated by reference.

The signal obtained is applied to an input of a multivibrator 30. Another, inverting input is connected to a positive direct voltage to which the reset input is also connected. Both inputs are operative as OR gates. Multivibrator 30 is one of the two retriggerable resettable monostable multivibrators incorporated in an integrated circuit of the Philips type HEF4538B. The series circuit of an adjustable resistor 31 of 100 k $\Omega$ at a maximum, a fixed resistor 32 of 4.7 k $\Omega$ and a capacitor 33 of 100 pF is connected to suitable connection terminals of multivibrator 30. At the other end, resistor 31 is connected to a positive direct voltage and, at the other end, capacitor 33 is connected to ground. A pulsatory signal, which is applied to phase detector PD via switch S2, is derived from an inverting output $\overline{Q}$ of multivibrator 30. It comprises negatively directed pulses whose rising trailing edges are delayed with respect to the leading edges of the pulse at the input of multivibrator 30 by a delay which is adjustable by means of resistor 31. The phase of the line deflection is adjusted thereby with respect to the video signal. The phase of these rising edges is measured with respect to the rising edges of the retrace signal by means of phase detector PD.

A resistor 34 of 47 k $\Omega$ is incorporated between the junction point of switch S2 and phase detector PD and ground. After instant $t_2$ the output PC of phase detector PD has the neutral value, but the local pulses occurring later produce a decrease at this output. For rapid capturing after the end of the 10 line periods in which the control loop has been interrupted, it is desirable for the neutral value to be restored approximately when the loop closes. This can be realized by interrupting the supply of the signal LS or by applying a pulse edge to the input of detector PD to which signal HS is normally applied. In the circuit of FIG. 3, such a pulse edge is obtained by means of resistor 34. A short delay, caused by switching elements, after the loop and switch S2 are closed again, the rising edge of a line synchronizing pulse at the output $\overline{Q}$ of multivibrator 30 produces a rising edge across resistor 34. It will be noted that a simple measure of interrupting the operation of the control loop and of obtaining the neutral value at the end of the interruption is not possible with the integrated circuit used in FIG. 3, that is to say the interruption of the operation of detector PD by means of a set signal. Consequently, the output PC assumes the neutral value during the desired 10 line periods so that the interruption by means of switch S1 of the supply of the control signal to filter LF, as well as the interruption by means of switch S2 of the supply of the line synchronizing pulses and also the aforementioned pulse edge at the end of the interruption are not necessary. However, the PC74HC/HCT4046A does not have an input for such a set pulse.

The circuit of FIG. 3 may have a facility for generating the field synchronizing signal, which facility is not shown and which is similar to the facility described for generating the synchronizing signal HS. The signal obtained has a given polarity and pulse edges which are adjustable with respect to time. It will be noted that a pulse is present at the output of counter CT1 having the most significant bit, which pulse commences shortly after the occurrence of the first pre-equalizing pulse and which has a duration of 10 line period. This pulse may function as a field synchronizing signal VS to be applied to a field synchronizing circuit.

If a rapid variation of the incoming line frequency occurs, the control signal generated by the filter LF varies rather rapidly. This may be inadmissible for elements of circuit LD. For limiting the variation rate of the control signal, a series circuit of a capacitor 35 of 470 nF and two anti-parallel connected diodes 36 and 37 is arranged in parallel with the arrangement of capacitors 10 and 11 of filter LF. If the voltage across capacitors 10, 11 increases in the one or the other direction above the value of the transition voltage of a diode, the relevant diode conducts so that capacitor 35 is charged slowly, which limits the rate. It will be noted that this safeguard is necessary due to the good properties of the synchronizing circuit.

It will be evident that the construction of some elements of the circuit of FIG. 3 is of no importance for the invention. The same applies to the values given. Particularly, the duration T may be chosen arbitrarily and it is not necessary for the time delay of element DE to be equal to duration T. If duration T is very short, the compensation by means of stage CP and switch S3 is not strictly necessary. Instead of interruption by means of switch S2 of the supply of the synchronizing signal, the supply of the oscillator to detector PD can be interrupted either directly or via the line deflection circuit LD, obtaining the same result.

What is claimed is:

1. A circuit for line synchronization in a picture display device, said circuit comprising a phase control loop including an oscillator for generating a local line-frequency signal, a phase comparison stage, means coupled to said oscillator for applying the local line-frequency signal and an incoming signal comprising a line synchronizing signal to said phase comparison stage for comparing the phase between the local line-frequency signal and the line synchronizing signal, and a loop filter for smoothing an output signal of said phase comparison stage and for supplying said smoothed signal as a control signal to said oscillator for controlling a frequency and/or a phase of the local line-frequency signal, characterized in that said phase comparison stage comprises a phase-frequency detector having a trigger action on edges of pulses in input signals applied thereto, and said circuit further comprises means coupled to an output of said phase-frequency detector for determining if a phase difference detected by said phase-frequency detector between the local line-frequency signal and the line synchronizing signal is larger than a predetermined value, and means coupled between said phase-frequency detector and said loop filter for inhibiting the supply of said control signal during a first predetermined period after said determining means has determined that the phase difference between the local line-frequency signal and the line synchronizing signal is larger than said predetermined value.

2. A circuit as claimed in claim 1, characterized in that after said first predetermined period in which the supply of the control signal has been inhibited, the output signal of said phase-frequency detector has an intermediate value which is substantially equal to a value of the output signal during an interval between respective consecutive pulses in the local line-frequency signal and the line synchronizing signal when a phase difference between said respective pulses is smaller than said predetermined value when the control signal is enabled.

3. A circuit as claimed in claim 2, characterized in that said circuit further comprises means for generating a set signal for setting said phase-frequency detector to a state in which the output signal of said phase-frequency detector has said intermediate value.

4. A circuit as claimed in claim 2, characterized in that said inhibiting means coupled between said phase-frequency detector and said loop filter includes a first switch for inhibiting the supply of the output signal of said phase-frequency detector to said loop filter during said first predetermined period after said determining means has determined that said phase difference detected by said phase-frequency detector is larger than said predetermined value.

5. A circuit as claimed in claim 4, characterized in that said inhibiting means further comprises a second switch for inhibiting the supply of one of the input signals to an input of the phase-frequency detector during said first predetermined period in which said first switch is non-conducting.

6. A circuit as claimed in claim 5, characterized in that said circuit further comprises means for enabling the supply of the control signal during a second predetermined period after the supply of the control signal has been inhibited, irrespective of the phase difference between the local line-frequency signal and the line synchronizing signal.

7. A circuit as claimed in claim 6, characterized in that said second switch is conducting during said second predetermined period after the supply of the control signal has been inhibited.

8. A circuit as claimed in claim 5, characterized in that said circuit further comprises means for applying a pulse edge to said input of the phase-frequency detector to which the supply of said one of the input signals is inhibited, at an end of said first predetermined period during which said first and second switches are non-conducting.

9. A circuit as claimed in claim 8, characterized in that said determining means comprises a pulse duration discriminator for receiving a signal generated by said phase-frequency detector indicating the phase difference between edges of pulses in the respective input signals applied to said phase-frequency detector, and for applying information to a control stage for blocking the first and second switches when the phase difference is larger than said predetermined value.

10. A circuit as claimed in claim 9, characterized in that said circuit further comprises means for deriving a field synchronizing signal from said control stage.

11. A circuit as claimed in claim 1, characterized in that during said first predetermined period in which the supply of the control signal is inhibited, the local line-frequency signal has substantially the same frequency as before said determining means has determined that the phase difference detected by said phase-frequency detector is larger than said predetermined value.

12. A circuit as claimed in claim 11, characterized in that said circuit further comprises means for adding a compensating signal to an input signal of the loop filter during said first predetermined period, said compensating signal substantially eliminating a deviation of the control signal caused during a detection period of said phase-frequency detector.

13. A circuit as claimed in claim 12, characterized in that said adding means comprises an inverter stage connected to an output of the phase-frequency detector.

14. A circuit as claimed in claim 13, characterized in that said circuit further comprises a third switch for selectively passing the compensating signal to said loop filter.

15. A circuit as claimed in claim 1, characterized in that said first predetermined period commences with a first pulse in said local line-frequency signal occurring after said determining means has determined that said phase difference detected by said phase-frequency detector is larger that said predetermined value, said first predetermined period having at least a same duration as a field synchronizing interval.

16. A circuit as claimed in claim 15, characterized in that said inhibiting means inhibits the supply of the control signal for approximately 10 line periods.

17. A circuit as claimed in claim 1, characterized in that said loop filter comprises means for limiting the rate of variation of the control signal upon variation of the frequency of the incoming line synchronizing signal.

18. A circuit as claimed in claim 17, characterized in that said limiting means comprises a series arrangement of a two-direction limiter and a capacitor arranged in parallel with a capacitor which forms a part of the loop filter.

19. A circuit as claimed in claim 1, characterized in that said circuit further comprises a circuit for generating said line synchronizing signal having line synchronizing pulses of a predetermined polarity for application to said phase-frequency detector.

20. A circuit as claimed in claim 1, characterized in that said circuit further comprises a circuit for generating said line synchronizing signal having line synchronizing pulses with pulse edges which are adjustable with respect to time for application to said phase-frequency detector.

* * * * *